(12) United States Patent
Campardo et al.

(10) Patent No.: US 7,499,345 B2
(45) Date of Patent: Mar. 3, 2009

(54) NON-VOLATILE MEMORY IMPLEMENTED WITH LOW-VOLTAGES TRANSISTORS AND RELATED SYSTEM AND METHOD

(76) Inventors: Giovanni Campardo, Via F. Rillosi, 9, I-24128 Bergamo (BG) (IT); Rino Micheloni, Via Como, 8, I-22078 Turate (CO) (IT); Luca Crippa, Via Manzoni, 66, I-20040 Busnago (MI) (IT); Giancarlo Ragone, Vico 3° Micaré, 43, I-89047 Roccella Jonica (RC) (IT); Miram Sangalli, Via XXV Aprile, 11D, I-20061 Carugate (MI) (IT);

( * ) Notice: Subject to any disclaimer, the term of this patent is extended or adjusted under 35 U.S.C. 154(b) by 0 days.

(21) Appl. No.: 11/605,209

(22) Filed: Nov. 27, 2006

(65) Prior Publication Data

US 2008/0018380 A1 Jan. 24, 2008

(30) Foreign Application Priority Data

| Nov. 25, 2005 | (EP) | ................................... 05111284 |
| Mar. 17, 2006 | (EP) | ................................... 06111337 |
| Mar. 21, 2006 | (EP) | ................................... 06111477 |
| Apr. 12, 2006 | (EP) | ................................... 06112526 |
| May 4, 2006 | (EP) | ................................... 06113480 |
| Aug. 24, 2006 | (EP) | ................................... 06119440 |
| Aug. 24, 2006 | (EP) | ................................... 06119456 |

(51) Int. Cl.
*G11C 5/14* (2006.01)
*G11C 16/04* (2006.01)
*G05F 3/24* (2006.01)

(52) U.S. Cl. ............................. 365/189.09; 365/185.18; 365/226; 327/537; 327/543

(58) Field of Classification Search ............. 365/189.09
See application file for complete search history.

(56) References Cited

U.S. PATENT DOCUMENTS 4,318,015 A 3/1982 Schade, Jr. et al.

(Continued)

FOREIGN PATENT DOCUMENTS

EP 0 576 774 A1 1/1994

(Continued)

OTHER PUBLICATIONS

European Search Report for EP 06 11 9456 dated Jan. 31, 2007.

(Continued)

*Primary Examiner*—Son L Mai
(74) *Attorney, Agent, or Firm*—Blakely, Sokoloff, Taylor & Zafman LLP

(57) ABSTRACT

An embodiment of an electronic apparatus is provided. The electronic apparatus includes a supplying block for supplying a plurality of operative voltages, one or more operative circuits and a distribution bus for distributing at least part of the operative voltages to each operative circuit. Each operative circuit includes a set of devices for generating a set of output voltages from a set of input ones of the distributed operative voltages. The input and output voltages span an effective range. Each device is capable of sustaining at most a safe voltage between each pair of terminals thereof not higher than the effective range. The devices are controlled by a set of auxiliary ones of the distributed operative voltages spanning an auxiliary range within the effective range, so that a difference between the voltage applied to each pair of terminals thereof is not higher than the safe voltage.

38 Claims, 3 Drawing Sheets

U.S. PATENT DOCUMENTS

| | | | | |
|---|---|---|---|---|
| 4,404,659 | A * | 9/1983 | Kihara et al. | 365/185.16 |
| 5,321,287 | A * | 6/1994 | Uemura et al. | 257/316 |
| 5,473,277 | A | 12/1995 | Furumochi | |
| 5,786,617 | A | 7/1998 | Merrill et al. | |
| 5,907,171 | A * | 5/1999 | Santin et al. | 257/315 |
| 6,023,085 | A * | 2/2000 | Fang | 257/315 |
| 6,111,425 | A | 8/2000 | Bertin et al. | |
| 6,351,173 | B1 | 2/2002 | Ovens et al. | |
| 6,410,387 | B1 * | 6/2002 | Cappelletti et al. | 438/257 |
| 6,806,540 | B2 * | 10/2004 | Watanabe et al. | 257/369 |
| 7,075,140 | B2 * | 7/2006 | Spadea | 257/315 |
| 7,095,651 | B2 * | 8/2006 | Shirota et al. | 365/185.05 |
| 7,154,789 | B2 * | 12/2006 | Kim et al. | 365/189.09 |
| 2001/0020840 | A1 | 9/2001 | Kojima | |
| 2002/0030204 | A1 | 3/2002 | Hirano | |
| 2002/0041000 | A1 * | 4/2002 | Watanabe et al. | 257/369 |
| 2003/0011418 | A1 | 1/2003 | Nishimura et al. | |
| 2003/0032242 | A1 * | 2/2003 | Lee et al. | 438/257 |
| 2003/0042971 | A1 | 3/2003 | Oikawa et al. | |
| 2004/0232511 | A1 * | 11/2004 | Fujio et al. | 257/500 |
| 2007/0147141 | A1 * | 6/2007 | Shibata | 365/189.09 |

FOREIGN PATENT DOCUMENTS

| | | |
|---|---|---|
| EP | 0 608 489 A | 8/1994 |
| EP | 0 921 627 A | 6/1999 |
| WO | WO 97/05696 A | 2/1997 |

OTHER PUBLICATIONS

European Search Report for EP 05 11 1284 dated Mar. 27, 2006.
European Search Report for EP 06 11 1477 dated Jul. 26, 2006.
European Search Report for EP 06 11 1337 dated Aug. 25, 2006.

* cited by examiner

NON-VOLATILE MEMORY IMPLEMENTED WITH LOW-VOLTAGES TRANSISTORS AND RELATED SYSTEM AND METHOD

PRIORITY CLAIM

This application claims priority from European patent application Nos. EP05111284.5, filed Nov. 25, 2005, EP06111337.9 filed on Mar. 17, 2006, EP06111477.3 filed on Mar. 21, 2006, EP06112526.6 filed Apr. 12, 2006, EP06113480.5 filed May 4, 2006, EP06119456.9 filed Aug. 24, 2006 and EP06119440.3 filed Aug. 24, 2006, all of which have a common assignee and which are incorporated by reference.

CROSS REFERENCE TO RELATED APPLICATIONS

This application is related to U.S. patent application Ser. No. 11/605,193, entitled "CHARGE PUMP SYSTEMS AND METHODS," which has a common filing date and assignee and which is incorporated by reference.

TECHNICAL FIELD

An embodiment of the present invention relates to the electronic field; more particularly, an embodiment of the present invention relates to electronic apparatuses that have to manage differentiated voltages.

BACKGROUND

Electronic apparatuses, such as semiconductor Integrated Circuits (ICs), can be classified in different categories, depending on the voltage differences that occur across the terminals of semiconductor devices included therein. In general, these voltage differences may be higher than a supply voltage of the IC or not.

More specifically, "standard" digital ICs—for example, logic circuits belonging to the Complementary Metal Oxide Semiconductor (CMOS) class—have to handle voltages that are usually equal to or lower than the supply voltage. Said ICs can be implemented with low voltage transistors designed in such a way to be able to sustain (across their terminals) maximum voltage differences that (in absolute value) equal to the supply voltage. Indeed, the low voltages that are experienced by those transistors allow their correct functioning (without breaking down) in any condition. For example, low voltage Metal Oxide Semiconductor (MOS) transistors are designed in such a way to avoid the occurrence of gate oxide break down or undesired junction breakdown when low voltage differences are applied to their terminals (for example, between the gate and source terminals).

Conversely, there exists a great variety of ICs that manage voltages that are higher than the supply voltage in absolute value—for example, non-volatile memories. In particular, in the non-volatile memories' high voltages are used to modify the data stored in their cells—e.g., to program and/or erase the cells, by activating known physical phenomena such as Channel Hot Electron (CHE) injection and Fowler-Nordheim Tunneling (FNT). The transistors used in such ICs are capable of withstanding high voltage differences across their terminals, without damage or malfunctioning, for example, to prevent gate oxides from breaking down or junction breakdown, or to prevent triggering undesired CHE injection or FNT.

As a consequence, referring for example to the case of MOS ICs, high voltage MOS transistors are designed, engineered and integrated (with ad-hoc manufacturing process steps) in such a way to avoid the occurrence of gate oxide break down or undesired junction breakdown even when high voltage differences are applied to their terminals (and especially between the gate and source terminals). In particular, high voltage MOS transistors have a gate oxide layer thicker than that normally used for the standard low voltage MOS transistors. Indeed, the thicker the gate oxide layer, the higher the voltage that it can sustain without undesired break down.

However, the use of high voltage transistors may pose constraints to the technology used to fabricate the IC. More particularly, even if the scaling of the transistors size, made possible by the evolution of the manufacturing technologies, allows drastically reducing the sizes of the low voltage transistors, the gate oxide layer of the high voltage transistors typically cannot be thinned, without putting at risk their capability of sustaining the desired voltages. Consequently, it may not be possible to shrink the sizes of the high voltage transistors, and thus it may be difficult to achieve the desired reduction in the silicon area occupied by those ICs including high voltage transistors.

Moreover, the use of both low voltage and high voltage transistors may increase the number of processing steps and masks (for example, for differentiating the oxide thickness of the high and low voltage transistors); this may have a detrimental impact on the manufacturing process of the memory device.

SUMMARY

In general, an embodiment of the present invention is based on the idea of using auxiliary voltages for controlling the devices included in the electronic apparatus.

More specifically, an embodiment of the invention provides an electronic apparatus. The electronic apparatus includes a supplying block for supplying a plurality of operative voltages, one or more operative circuits and a distribution bus for distributing at least part of the operative voltages to each operative circuit. Each operative circuit includes a set of devices for generating a set of output voltages from a set of input ones of the distributed operative voltages. The input and output voltages span an effective range. Each device is capable of sustaining at most a safe voltage (between each pair of terminals thereof) not higher than the effective range. The devices are controlled by a set of auxiliary ones of the distributed operative voltages spanning an auxiliary range within the effective range, so that a difference between the voltages applied to each pair of terminals thereof is not higher than the safe voltage.

In an embodiment of the invention, each device is an insulated gate field effect transistor.

Advantageously, the operative voltages are uniformly spaced to each other.

Typically, the difference between each pair of adjacent operative voltages is at most equal to a supply voltage of the electronic apparatus.

In an embodiment of the invention, the supplying block includes one or more charge pumps for generating the operative voltages.

In this case, the operative circuits include the charge pumps themselves.

In an embodiment of the invention, the operative circuits include a voltage regulator.

In an embodiment of the invention, the operative circuits include a voltage switch.

Typically, the electronic apparatus is a non-volatile memory.

In this case, the operative circuits include a row selector and a column selector.

According to an embodiment of the present invention, the electronic apparatus is a NAND memory.

According to an alternative embodiment of the present invention, the electronic apparatus is a NOR memory.

Preferably, the electronic apparatus is integrated in a chip of semiconductor material.

A further embodiment of the invention proposes a system including one or more of those electronic apparatuses.

Another embodiment of the invention proposes a corresponding method.

BRIEF DESCRIPTION OF THE DRAWINGS

Embodiments of the invention, as well as features and advantages thereof, will be best understood by reference to the following detailed description, given purely by way of a non-restrictive indication, to be read in conjunction with the accompanying drawings, wherein.

DETAILED DESCRIPTION

Figure 1:
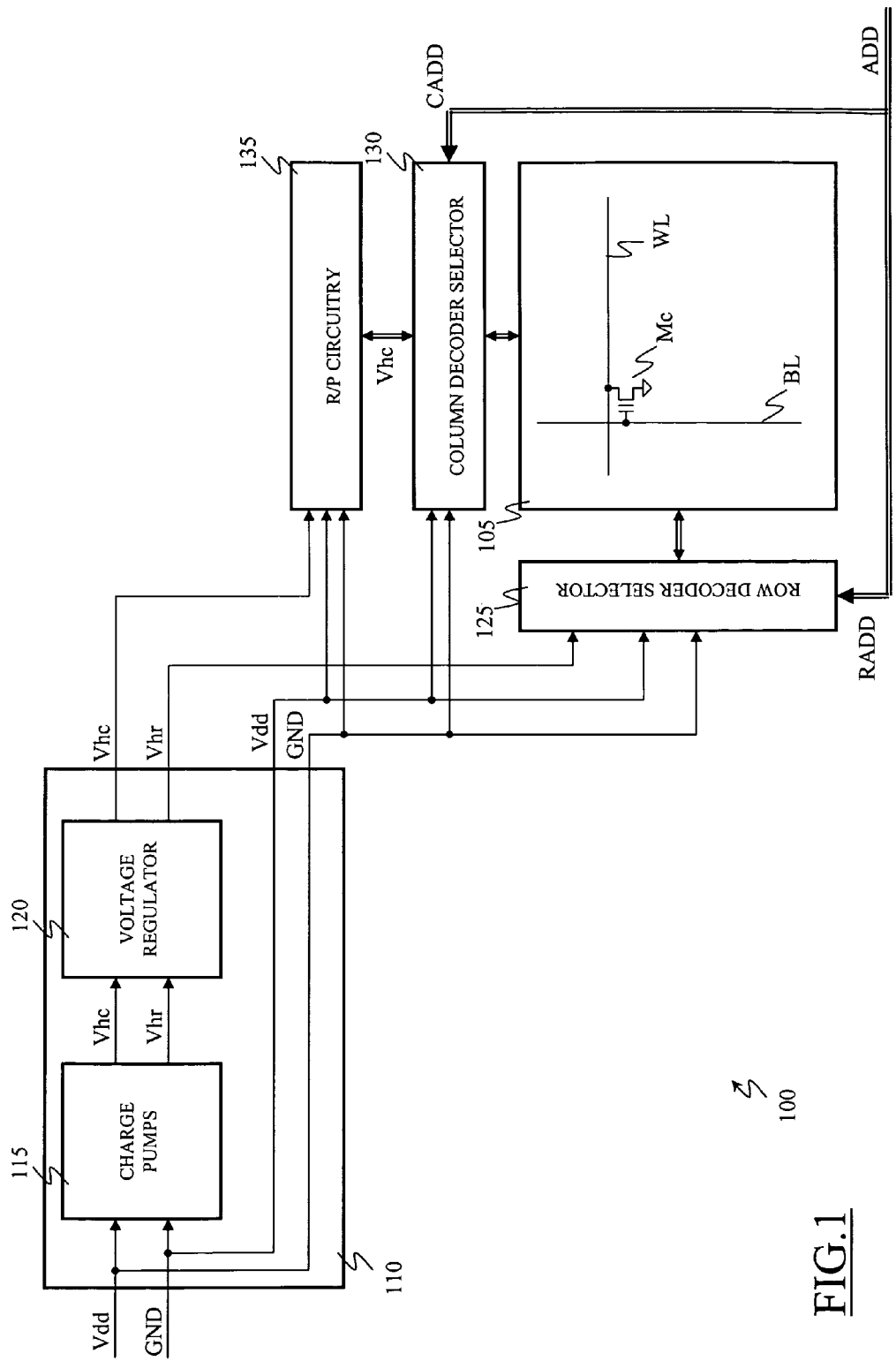
FIG. 1 shows a schematic block diagram of a generic non-volatile memory known in the art.

With reference to the drawings, in FIG. 1 a non-volatile memory 100, for example a flash $E^2PROM$, is illustrated. The memory 100 includes a matrix 105 of memory cells Mc. Typically, each memory cell Mc includes a floating gate NMOS transistor. In an erased condition, the memory cell Mc has a low threshold voltage (conventionally associated with a logic value "1"). The memory cell Mc is programmed by injecting electric charges into its floating gate; in the programmed condition, the memory cell Mc has a high threshold voltage (conventionally associated with a logic value "0"). Therefore, when a selected memory cell Mc is biased for reading, the memory cell Mc is conductive if erased or non-conductive if programmed.

The memory cells Mc are arranged in rows and columns. The memory 100 includes a bit line BL for each column of the matrix 105, and a word line WL for each row of the matrix. The memory 100 has a so-called NOR architecture, in which the memory cells Mc of a same column are all connected in parallel. Particularly, the memory cells Mc of each column have the drain terminals connected to a respective bit line BL, while the memory cells Mc of each row have the gate terminals connected to a respective word line WL. The source terminals of all the memory cells Mc are connected to a source line that generally is maintained at a reference voltage GND (or ground voltage). All the memory cells Mc are erased at the same time. Conversely, the memory 100 simultaneously reads/programs a word (for example, of 16 bits). The bits of each word are stored in memory cells Mc associated with a single word line WL.

Similar considerations apply to other memory architectures, such as the so-called NAND architecture; in this case, groups of memory cells of a same column are serially interconnected so as to form respective strings, which strings are then connected in parallel to a same bit line.

The memory 100 further includes a Power Management Unit (PMU) 110. The PMU 110 receives the ground voltage GND and a supply voltage Vdd (for example, having a value of 3 Volts with respect to the ground voltage GND) from the outside of the memory 100. The PMU 110 provides different operative voltages—in the example illustrated in FIG. 1, the ground voltage GND, the supply voltage Vdd and two boosted voltages Vhr and Vhc—that are used for performing the conventional operations (such as read, program, erase and verify) on the memory 100. The PMU 110 generates the boosted voltages Vhr, Vhc from the ground voltage GND and the supply voltage Vdd. The boosted voltages Vhr, Vhc may be higher in absolute value than the supply voltage Vdd, for example, ranging from −9 Volts to 12 Volts. For this purpose, the PMU includes a charge pump block 115 and a voltage regulator block 120. The charge pump block 115 includes one or more charge pumps adapted to generate the boosted voltages Vhr, Vhc from the supply voltage Vdd and the ground voltage GND; the boosted voltages Vhr, Vhc are provided to the voltage regulator block 120, which maintains them at stable levels.

Moreover, the memory 100 receives an address code ADD for accessing a selected page of memory cells Mc storing a word. The address code ADD includes a logical signal (GND-Vdd) formed by a set of bits (such as 8-32).

The selection of the desired word line WL is carried out by means of a row decoder selector block 125 receiving the supply voltage Vdd, the ground voltage GND and the boosted voltage Vhr. The row decoder selector block 125 further receives a portion of the address code ADD, namely, a row address RADD, and accordingly enables a single word line WL. Particularly, the row decoder selector block 125 biases the selected word line WL to the boosted voltage Vhr while the other word lines WL are driven to the ground voltage GND. The value taken by the boosted voltage Vhr depends on the operation (read, program, erase or verify) to be performed on the selected memory cells Mc. For example, during a read operation the boosted voltage Vhr is brought to a value slightly higher than the supply voltage Vdd (for example, ranging from 3 to 5 Volts), while during a program operation the boosted voltage Vhr is brought to a value considerably higher than the supply voltage (for example, ranging from 5 to 15 Volts).

The selection of the desired bit lines is instead carried out by means of a column decoder selector block 130 receiving the supply voltage Vdd and the ground voltage GND. The column decoder selector block 130 receives another portion of the address code ADD, namely, a column address CADD, and accordingly enables a set of selected bit lines BL. Particularly, the column decoder selector block 130 connects the selected bit lines BL to a Read/Program (R/P) circuitry 135; the other bit lines BL are instead kept isolated from the R/P circuitry 135. The R/P circuitry 135 includes all the components (e.g., sense amplifiers, comparators, reference current/voltage generators, pulse generators, program load circuits and the like), which are normally used for programming the desired logic values into the selected memory cells Mc and for reading the logic values currently stored therein. In order to accomplish said operations, the R/P circuitry 135 receives the supply voltage Vdd, the ground voltage GND and the boosted voltage Vhc. More particularly, the boosted voltage Vhc is provided (through the column decoder selector block 135) to all the selected bit lines BL. The value taken by the boosted voltage Vhc depends on the operations (read, program, erase or verify) to be performed on the selected memory cells Mc. For example, during a program operation the boosted voltage Vhc is brought to a value higher than the supply voltage Vdd (for example, 5 Volts), while during a read operation the boosted voltage Vhc is brought to a low value (for example, 1 Volt).

As can be seen, each circuit block 115-130 handles input and output voltages that span a corresponding effective range (from the lowest handled voltage to the highest handled voltage), which may be higher than the supply voltage Vdd.

For example, during a program operation, the boosted voltage Vhr takes the value of 15 Volts and the boosted voltage Vhc takes the value of 5 Volts, and the effective range spanned by the handled voltages of the charge pump block 115 and of the row decoder selector block 125 is equal to 15 Volts (i.e., from the ground voltage GND to the boosted voltage Vhr), while the effective range of the column decoder selector block 130 and of the R/P circuitry 135 is 5 Volts (i.e., from the ground voltage GND to the boosted voltage Vhc).

Therefore, in some operative conditions, it may happen that the components (such as MOS transistors) receive a voltage difference at a pair of terminals thereof exceeding the supply voltage Vdd (e.g, for a MOS transistor included in the charge pump block 115 having a terminal providing the boosted voltage Vhr and another terminal receiving the ground voltage GND).

These components are implemented with high voltage MOS transistors, which are able to sustain these high voltage differences without experiencing any damaging or malfunction (with the drawbacks described above).

Figure 2:
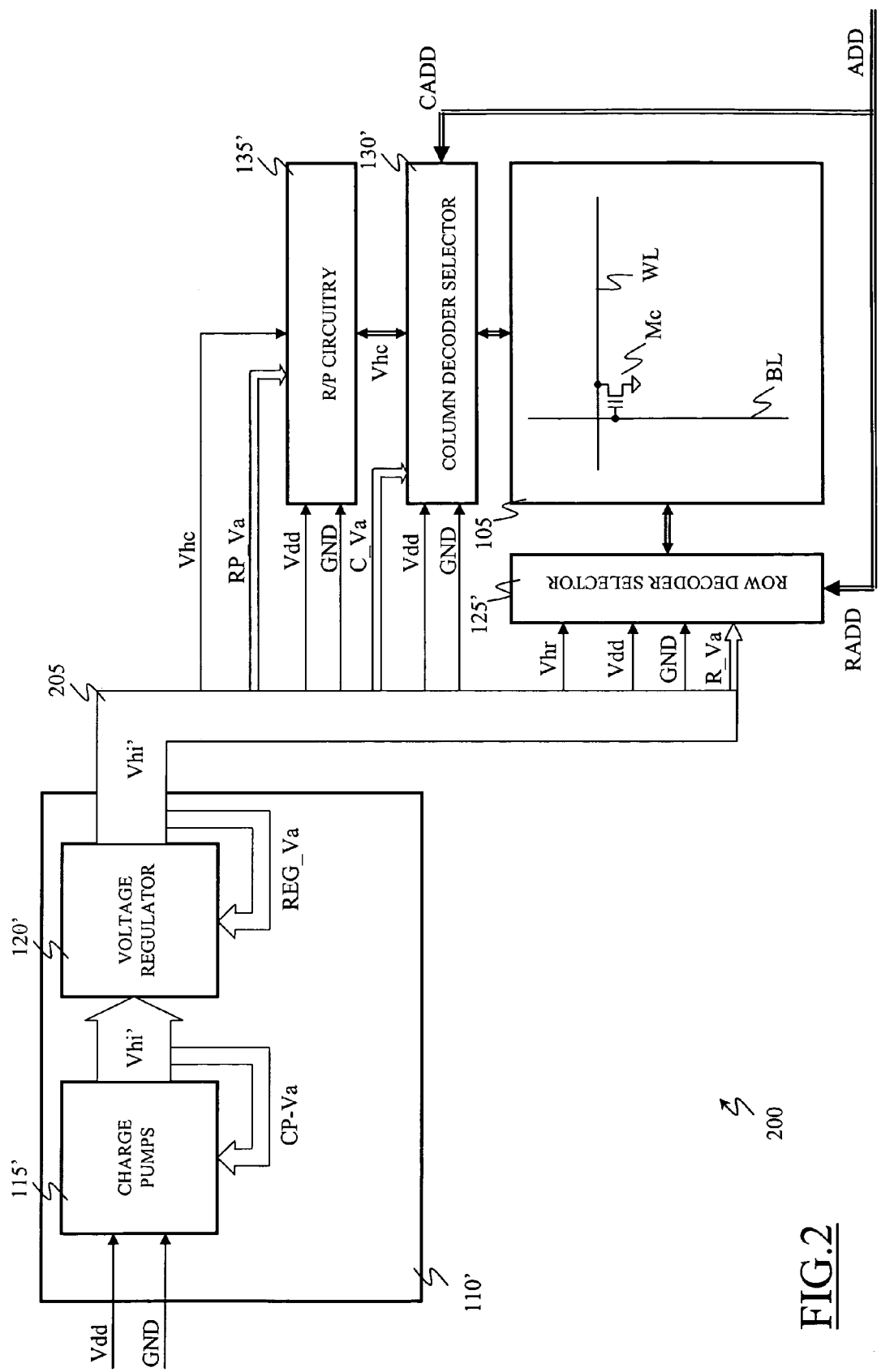
FIG. 2 shows a schematic block diagram of a non-volatile memory according to an embodiment of the present invention.

FIG. 2 illustrates a non-volatile memory 200 according to an embodiment of the present invention. The elements corresponding to those shown in the FIG. 1 are denoted with the same references and their explanation is omitted for the sake of brevity; the elements corresponding to those shown in the FIG. 1 that have a different structure will instead be described in an attached Appendix.

More particularly, the memory 200 includes a PMU 110' that generates a plurality of operative voltages Vhi' (i=1 to n), which are distributed in the memory 200 through a distribution bus 205. The PMU 110' generates the operative voltages Vhi' from the supply voltage Vdd and the ground voltage GND.

As above, the operative voltages Vhi' include the supply voltage Vdd, the ground voltage GND, and the boosted voltages Vhr, Vhc. According to an embodiment of the present invention, the operative voltages Vhi' further include auxiliary voltages (whose purpose will be apparent in the following), which are distributed within the other voltages being used in the memory 200 (i.e., GND, Vdd, Vhr, Vhc). Particularly, the operative voltages Vhi' are arranged so as to form an ordered sequence, with each operative voltage Vhi' that is higher than the preceding operative voltage Vh(i−1)' by an amount at most equal to the supply voltage Vdd (i.e., the difference between each pair of adjacent operative voltages Vhi', Vh(i+1)' is not higher than Vdd). Preferably, the operative voltages Vhi' are evenly distributed in the sequence (i.e., the difference between each pair of adjacent operative voltages is always the same), although this is not required.

As above, the PMU 110' includes a charge pump block 115' and a voltage regulator 120'. The charge pump block 115' includes one or more charge pumps (not shown in FIG. 2) adapted to generate the operative voltages Vhi' from the supply voltage Vdd and the ground voltage GND; the operative voltages Vhi' are provided to the voltage regulator block 120', which maintains them at stable levels.

In addition, the charge pump block 115' receives a set of corresponding auxiliary voltages (dented with CP_Va), which are obtained from the same operative voltages Vhi' generated by the charge pump block 115' itself. The auxiliary voltages CP_Va span an auxiliary range within the effective range spanned by the input and output voltages of the charge pump block 115' (i.e., from the ground voltage GND to the highest operative voltage Vhi' that is generated). In any case, the collection of all the voltages handled by the charge pump block 115'—i.e., the collection formed by the input voltages, the output voltages, and the auxiliary voltages—forms an ordered sequence in which the difference between each pair of consecutive voltages is always at most equal to the supply voltage Vdd.

The voltage regulator block 120' receives as input the operative voltages Vhi' generated by the charge pump block 115', and accordingly outputs corresponding stabilized operative voltages Vhi'. In this case as well, the voltage regulator block 120' receives a set of corresponding auxiliary voltages (denoted with REG_Va), which are obtained from the same operative voltages Vhi' outputted by the regulator block 120' itself. Likewise, the auxiliary voltages REG_Va span an auxiliary range within the corresponding effective range, with the collection of all the voltages handled by the voltage regulator block 120' forming an ordered sequence in which the difference between each pair of consecutive voltages is always at most equal to the supply voltage Vdd.

The operative voltages Vhi' output by the voltage regulator block 120' are provided to the rest of the memory 200 by means of the distribution bus 205.

The memory 200 further includes a row decoder selector block 125' for the selection of the word lines WL; the row decoder selector block 125' receives (as inputs from the distribution bus 205) the supply voltage Vdd, the ground voltage GND and the boosted voltage Vhr, and provides as outputs the ground voltage GND (to the unselected word lines WL) and the boosted voltage Vhr (to the selected word line WL). The row decoder selector block 125' further receives (from the distribution bus 205) a set of corresponding auxiliary voltages (denoted with R_Va) spanning an auxiliary range within the effective range of the row decoder selector block 125' itself. As above, the collection of all the voltages handled by the row decoder selector block 125' forms an ordered sequence in which the difference between each pair of consecutive voltages is always at most equal to the supply voltage Vdd.

The memory 200 further includes a column decoder selector block 130', for the selection of the bit lines BL, which are coupled to an R/P circuitry 135' adapted to perform read and program operations.

The R/P circuitry 135' receives (as inputs from the distribution bus 205) the supply voltage Vdd, the ground voltage GND and the boosted voltage Vhc, and provides as output the boosted voltage Vhc to the column decoder selector block 130'. The R/P circuitry 135' further receives (from the distribution bus 205) a set of corresponding auxiliary voltages (denoted with RP_Va) spanning an auxiliary range within the effective range of the R/P circuitry 135' itself. As for the other circuit blocks, the collection of all the voltages handled by the R/P circuitry 135' forms an ordered sequence in which the difference between each pair of consecutive voltages is always at most equal to the supply voltage Vdd.

At the end, the column decoder selector block 130' receives (as input from the R/P circuitry 135') the boosted voltage Vhc and (from the distribution bus 205) the supply voltage Vdd and the ground voltage GND. Accordingly, the column decoder selector block 130' provides as output the boosted voltage Vhc to the selected bit lines BL. The column decoder selector block 130' further receives (as input from the distribution bus 205) a set of corresponding auxiliary voltages (denoted with C_Va) spanning an auxiliary range within the effective range of the column decoder selector block 130' itself. As for the other circuit blocks, the collection of all the voltages handled by the column decoder selector block 130' forms an ordered sequence in which the difference between each pair of consecutive voltages is always at most equal to the supply voltage Vdd.

Figure 3:
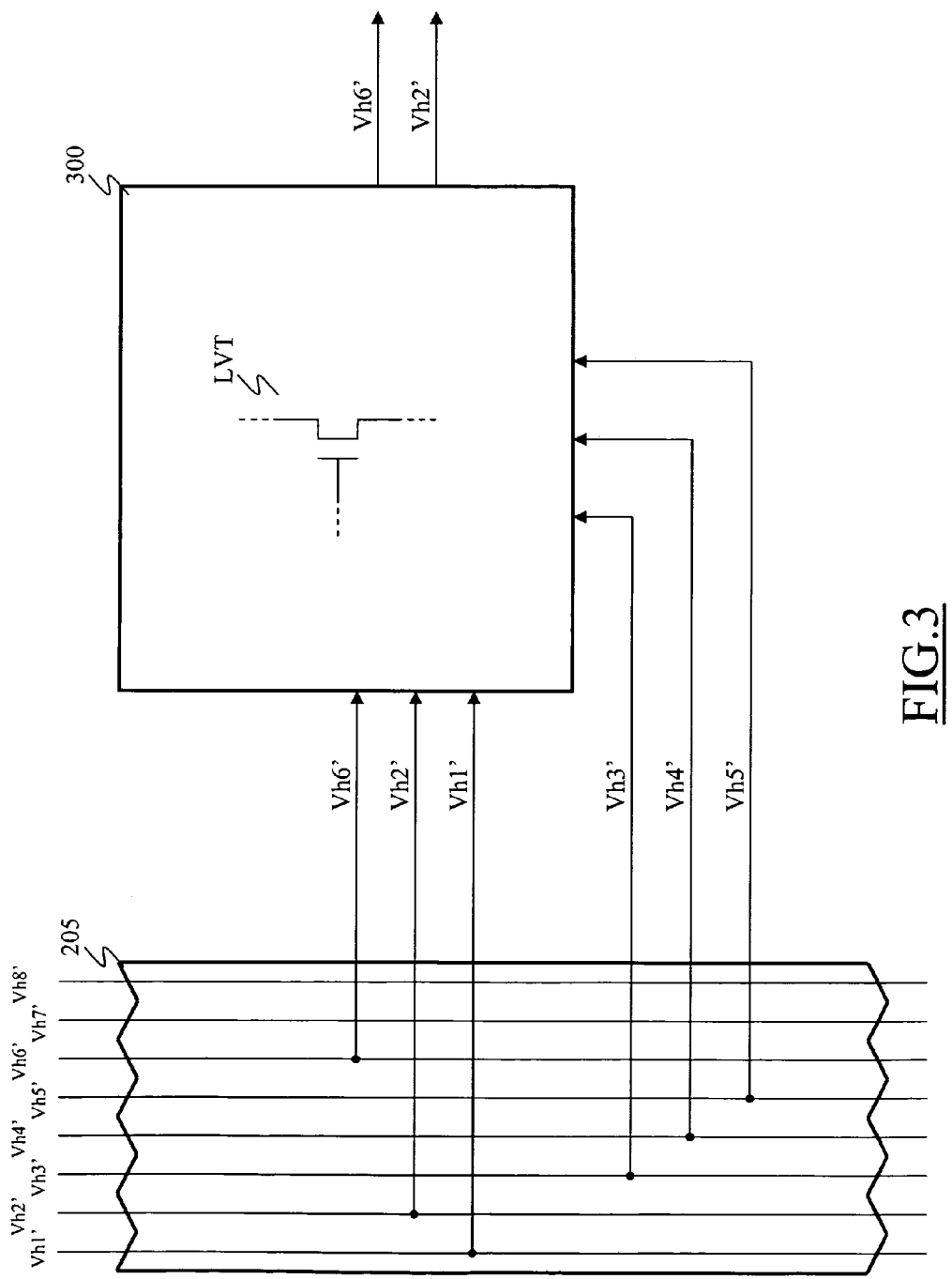
FIG. 3 shows an exemplary circuit of the non-volatile memory of FIG. 2 according to an embodiment of the present invention.

Referring now to FIG. 3, a generic circuit block 300 of the memory 200 is schematically shown according to an embodiment of the present invention; more particularly, the circuit block 300 may be one of the circuit blocks (e.g., charge pumps 115, voltage regulator 120, R/P circuitry 135, column decoder selector 130, row decoder selector 125, and matrix 105) previously described with reference to FIG. 2.

According to the example at issue, the operative voltages Vhi' distributed by the distribution bus 205 are eight: Vh1', Vh2', . . . , Vh8', with the first operative voltage Vh1' being the lowest voltage of the sequence (e.g., equal to the ground voltage GND). Moreover, according to this example, the difference between each pair of adjacent operative voltages Vhi', Vh(i+1)' is equal to Vdd.

The circuit block 300 receives as inputs the operative voltages Vh1', Vh2', Vh6', and provides as outputs the operative voltages Vh2', Vh6'. The corresponding effective range spanned by the input and output voltages of the circuit block 300 is from Vh1' to Vh6', i.e., is equal to 6 Vdd.

The circuit block 300 further receives a set of corresponding auxiliary voltages Vh3', Vh4' and Vh5', spanning a corresponding auxiliary range from Vh3' to Vh5', i.e., is equal to 3 Vdd.

The circuit block 300 includes a plurality of low voltage transistors LVT (only one shown in FIG. 3), for example, MOS transistors; each low voltage transistor LVT is capable of sustaining (across its terminals) voltage differences that are limited (in absolute value) to the supply voltage Vdd.

As can be observed, the effective range spanned by the input and output voltages of the circuit block 300 is higher than the supply voltage Vdd. This means that the circuit block 300 is not implemented using the low voltage transistors LVT directly. For example, it is not possible to connect the input terminal receiving the operative voltage Vh1' is not connected with the output terminal providing the operative voltage Vh6 through a single low voltage transistor LVT. Indeed, the latter low voltage transistor LVT would have a pair of terminals experiencing a voltage difference much higher than the supply voltage Vdd. This might cause gate oxide breakdown or undesired junction breakdown of the low voltage transistor LVT.

However, thanks to the presence of the auxiliary voltages Vh3', Vh4', Vh5', it is possible to control the low voltage transistors LVT forming the circuit block 300 in such a way to have that the effective range is distributed among more than one low voltage transistor LVT. In this way, it is possible to have the respective difference between the voltages applied to each pair of terminals of said low voltage transistors LTV not higher than the supply voltage Vdd.

Thanks to the solution provided by an embodiment of the present invention, non-volatile memory devices can be implemented using low voltage transistors only.

Indeed, thanks to the presence of the auxiliary voltages, it is not necessary to design and integrate dedicated high voltage transistors.

Moreover, by using only low voltage transistors, it is easy to reduce the silicon area occupied by the memory with respect to the case in which high voltage transistors are used.

With the possibility of implementing the memory using a single type of transistors, and without having to differentiate the oxide thickness between the high and low voltage transistors, it is possible to decrease the number of processing steps and masks of the manufacturing process of the memory.

U.S. patent application Ser. No. 11/605,193, entitled "CHARGE PUMP SYSTEMS AND METHODS," which is incorporated by reference, describes a charge pump implemented with low voltage transistors only, which can be included in the charge pump block 115' illustrated in the FIG. 2 of the present description. More particularly, according to an embodiment of the present invention, the boosted voltages Vhr, Vhc and the various auxiliary voltages can be taken from the nodes N1-N6 of the charge pump 100 described in pages 6-26 of U.S. patent application Ser. No. 11/605,193, entitled "CHARGE PUMP SYSTEMS AND METHODS." In addition, U.S. patent application Ser. No. 11/605,193, entitled "CHARGE PUMP SYSTEMS AND METHODS," provides a negative charge pump 400 that can be implemented with low voltage transistors only (pages 26-41 of U.S. patent application Ser. No. 11/605,193, entitled "CHARGE PUMP SYSTEMS AND METHODS."

In Appendix A (corresponding to European Patent Application EP06113480.5), which forms part of this description, a row selector for a non-volatile memory (adapted to be implemented using low voltage transistors) is suggested. The row selector 125 of Appendix A may be, for example, included in the row decoder selector block 125' illustrated in the FIG. 2 of the present description.

According to an embodiment of the present invention, the row decoder selector block includes both level shifter circuits—adapted to convert logical signals into the high voltages used during program and erase operations—and voltage switch circuits—adapted to selectively connect one selected input terminal (among two or more input terminals) to an output terminal, keeping the latter electrically insulated from the unselected input terminals. An example of how implementing a level shifter circuit capable of handling high voltages and using low voltage transistors only is provided in Appendix B (corresponding to European Patent Application EP06111337.9), which forms part of this disclosure. Appendix C (corresponding to European Patent Application EP06111477.3), which forms part of this disclosure, teaches how to implement voltage switch circuits capable of handling high voltages and using low voltage transistors only. Particularly, each voltage switch circuit includes a first input terminal for receiving a first input voltage, a second input terminal for receiving a second input voltages, an output terminal, and a transfer block for selectively transferring the first input voltage or the second input voltage to the output terminal, as described in the pages 7-36 of Appendix C.

In Appendix D (corresponding to European Patent Application EP06112526.6), which forms part of this disclosure, a column decoding system for a non-volatile memory (adapted to be implemented using low voltage transistors) is suggested. The column decoding system 140, 150 of Appendix D may be, for example, included in the column decoder selector block 130' illustrated in the FIG. 2 of the present description.

Appendix E (corresponding to European Patent Application EP06119456.9), which forms part of this disclosure, suggests how to implement a voltage regulator for non-volatile memories (implemented with low voltage transistors only). For example, according to an embodiment of the present invention, the voltage regulator block 120' illustrated in the FIG. 2 of the present description includes the voltage regulator 150 illustrated in the FIG. 3 of Appendix E.

Appendix F (corresponding to European Patent Application EP06119440.3), which forms part of this disclosure, shows two further embodiments of row selectors adapted to be included in the row decoder selector block 125' illustrated in the FIG. 2 of the present description. Particularly, in the pages 5-18 of Appendix F is described a row selector 160 for a memory device having a NOR architecture, while in the pages 18-25 of Appendix F is described a row selector 660 for a memory device having a NAND architecture.

Naturally, in order to satisfy local and specific requirements, a person skilled in the art may apply to the solution(s) described above many modifications and alterations. Particularly, although the present invention has been described with a certain degree of particularity with reference to preferred embodiment(s) thereof, it should be understood that various omissions, substitutions and changes in the form and details as well as other embodiments are possible; moreover, it is expressly intended that specific elements and/or method steps described in connection with any disclosed embodiment of the invention may be incorporated in any other embodiment as a general matter of design choice.

For example, similar considerations apply if the electronic apparatus has another structure or includes equivalent operative circuits (down to a single one).

The numerical examples for the operative voltages, the effective range and the auxiliary range are merely illustrative, and are not intended to be limiting.

Moreover, nothing prevents supplying the operative voltages in a different way; for example it may be possible to provide the operative voltages directly from the outside of the electronic apparatus (with a supply block that includes the corresponding terminals).

It is noted that the operative voltages may be distributed to the different operative circuits in any other way (such as by means of dedicated lines).

Similar considerations apply if the low voltage MOS transistors are replaced by other types of low voltage transistors (such as low voltage bipolar transistors), or by equivalent electronic devices.

The concepts of the present invention are also applicable when the difference between each pair of adjacent operative voltages is not the same for all the pairs.

Even if in the present description the low voltage transistors have been described as capable of sustaining across pairs of their terminals voltage differences which are limited by the supply voltage, similar considerations apply for low voltage transistors capable of sustaining voltage differences lower or higher than the supply voltage (but still lower than the effective range).

Without departing from the principles of the invention, the operative voltages can be generated in any other way by an equivalent PMU (down to a single charge pump, even without a regulator).

Although reference has been made to non-volatile memories of the flash type, the concepts of the present invention are also applicable to other memory types, such as multilevel flash memories, phase-change memories and volatile memories; for example, in Static RAMs (SRAMs) and Dynamic RAMs (DRAMs), high voltages (higher than the supply voltage) can be used for biasing the cells of the memory, in such a way to improve the speed of the reading operations.

In any case, nothing prevents the application of the same solution to any other electronic apparatus (such as microprocessors and microcontrollers).

The proposed operative circuits (with their described structure) are not intended to be limiting. Particularly, the use of alternative structures for the operative circuits is contemplated; moreover, it is possible to apply the proposed solution only to some of the operative circuits.

The proposed electronic apparatus may be provided as a bare die, in a package, or in any other form.

Moreover, one or more of the provided electronic apparatuses may be included in intermediate products (such as mother boards) or in more complex systems (such as computers).

What is claimed is:

1. An electronic apparatus including:
    a supplying block for supplying a plurality of operative voltages;
    at least one operative circuit; and
    a distribution bus for distributing at least part of the operative voltages to each operative circuit,
    wherein each operative circuit includes a set of devices for generating a set of output voltages from a set of input voltages of the distributed operative voltages, the input and output voltages spanning an effective range, each device being capable of sustaining at most a safe voltage between each pair of terminals thereof not higher than the effective range, and wherein the devices are controlled by a set of auxiliary voltages of the distributed operative voltages spanning an auxiliary range within the effective range so that a difference between the voltages applied to each pair of terminals thereof is not higher than the safe voltage.

2. The electronic apparatus of claim 1, wherein each device is an insulated gate field effect transistor including a drain terminal, a gate terminal and a source terminal.

3. The electronic apparatus of claim 1, wherein the operative voltages are logically ordered in a sequence with increasing values, the difference between each pair of adjacent operative voltages in the sequence being equal to a common pitch value.

4. The electronic apparatus of claim 3, wherein said pitch value is at most equal to a difference between a supply voltage and a reference voltage of the electronic apparatus.

5. The electronic apparatus of claim 1, wherein the operative voltages include a supply voltage and a reference voltage of the electronic apparatus, and wherein the supplying block includes at least one charge pump for generating the other operative voltages from the supply voltage and the reference voltage.

6. The electronic apparatus of claim 5, wherein the at least one operative circuit includes the at least one charge pump, the input voltages of the at least one charge pump including the supplying voltage and the reference voltage, and the output voltages of the at least one charge pump including the other operative.

7. The electronic apparatus of claim 1, wherein the at least one operative circuit includes a voltage regulator for regulating at least part of the operative voltages.

8. The electronic apparatus of claim 1, wherein the at least one operative circuit includes a voltage switch having a first input terminal for receiving a first one of the input voltages, a second input terminal for receiving a second one of the input voltages, an output terminal, and a transfer block for selectively transferring the first input voltage or the second input voltage to the output terminal.

9. The electronic apparatus of claim 1, wherein the electronic apparatus is a non-volatile memory device including an array of memory cells arranged in rows and columns, the non-volatile memory device further including a plurality of word lines each one associated with a corresponding row and a plurality of bit lines each one associated with a corresponding column.

10. The electronic apparatus of claim 9, wherein the at least one operative circuit includes a row selector for selectively applying at least part of the input voltages to a set of selected ones of the word lines.

11. The electronic apparatus of claim 9, wherein the at least one operative circuit includes a column selector for selectively applying at least part of the input voltages to a set of selected ones of the bit lines.

12. The electronic apparatus of claim 9, wherein the electronic apparatus comprising a NAND memory device.

13. The electronic apparatus of claim 9, wherein the electronic apparatus comprises a NOR memory device.

14. The electronic apparatus of claim 1, wherein the electronic apparatus is integrated in a chip of semiconductor material.

15. A method for controlling an electronic apparatus including at least one operative circuit, the method including the steps of:
supplying a plurality of operative voltages;
distributing at least part of the operative voltages to each operative circuit; and
in each operative circuit, generating a set of output voltages from a set of input voltages of the distributed operative voltages by means of a set of devices, the input and output voltages spanning an effective range, each device being capable of sustaining at most a safe voltage between each pair of terminals thereof not higher than the effective range, and controlling the devices with a set of auxiliary voltages of the distributed operative voltages spanning an auxiliary range within the effective range so that a difference between the voltages applied to each pair of terminals thereof is not higher than the safe voltage.

16. A circuit, comprising:
input nodes each operable to receive a respective one of a plurality of input voltages including a lowest voltage, a highest voltage, and at least one intermediate voltage in between the lowest and highest voltages, each difference between respective pairs of sequential ones of the input voltages being no greater than a predetermined safe voltage; and
a set of interconnected electronic devices coupled to the input nodes, each device having a respective pair of device nodes, the set of electronic devices operable such that each voltage across each respective pair of the device nodes is no greater than the predetermined safe voltage.

17. The circuit of claim 16 wherein the input voltages have a same polarity.

18. The circuit of claim 16 wherein the input voltages have different polarities.

19. The circuit of claim 16 wherein the input voltages include multiple intermediate voltages.

20. The circuit of claim 16 wherein the differences between respective pairs of sequential ones of the input voltages are equal to a same value.

21. The circuit of claim 16, further comprising:
a first supply node operable to receive a first supply voltage;
a second supply node operable to receive a second supply voltage; and
wherein the predetermined safe voltage is no greater than a difference between the first and second supply voltages.

22. The circuit of claim 16 wherein at least one of the electronic devices comprises a transistor.

23. A circuit, comprising:
output nodes each operable to provide a respective one of a plurality of output voltages including a lowest voltage, a highest voltage, and at least one intermediate voltage in between the lowest and highest voltages, each difference between respective pairs of sequential ones of the output voltages being no greater than a predetermined safe voltage;
input nodes each coupled to a respective one of the output nodes; and
a set of interconnected electronic devices coupled to the input nodes, each device having a respective pair of device nodes, the set of electronic devices operable such that each voltage across each respective pair of the device nodes is no greater than the predetermined safe voltage.

24. The circuit of claim 23 wherein the number of input nodes is less than the number of output nodes.

25. The circuit of claim 23 wherein the number of input nodes is equal to the number of output nodes.

26. The circuit of claim 23 wherein the set of interconnected electronic devices is coupled to the output nodes and is operable to generate the output voltages.

27. A nonvolatile memory, comprising:
floating gate memory cells;
insulated gate transistors coupled to the floating-gate memory cells and each including a respective gate insulator substantially having a thickness;
no insulated gate transistor including a gate insulator having other than substantially the thickness
a first supply node operable to receive a first supply voltage;
a second supply node operable to receive a second supply voltage; and
wherein each of the insulated gate transistors has a gate insulator breakdown voltage that is substantially equal to or greater than a difference between the first and second supply voltages.

28. The nonvolatile memory of claim 27 wherein the insulated gate transistors each comprise a respective MOS type transistor.

29. An integrated circuit, comprising:
a first circuit comprising a plurality of output nodes and operable to respectively generate on the output nodes a plurality of output voltages including a lowest voltage, a highest voltage, and at least one intermediate voltage in between the lowest and highest voltages, each difference between respective pairs of sequential ones of the output voltages being no greater than a predetermined safe voltage; and
a second circuit having first input nodes coupled to receive the output voltages from the first integrated circuit, the second integrated circuit comprising a first set of interconnected electronic devices coupled to the first input nodes, each device having a respective pair of device nodes, the set of electronic devices operable such that each voltage across each respective pair of the device nodes is no greater than the predetermined safe voltage.

30. The integrated circuit of claim 29 wherein the first circuit further comprises:
second input nodes each coupled to a respective one of the output nodes; and
a second set of interconnected electronic devices coupled to the second input nodes, each device having a respective pair of device nodes, the second set of electronic devices operable such that each voltage across each respective pair of the device nodes is no greater than the predetermined safe voltage.

31. The integrated circuit of claim 29 wherein the number of second input nodes is less than the number of output nodes.

32. The integrated circuit of claim 29 wherein the number of second input nodes is equal to the number of output nodes.

33. The integrated circuit of claim 29 wherein the second set of interconnected electronic devices is coupled to the output nodes and is operable to generate the output voltages.

34. An electronic system, comprising:
a controller; and
an integrated circuit coupled to the controller and comprising,
a first circuit comprising a plurality of output nodes and operable to respectively generate on the output nodes a plurality of output voltages including a lowest voltage, a highest voltage, and at least one intermediate voltage in between the lowest and highest voltages, each difference between respective pairs of sequential ones of the output voltages being no greater than a predetermined safe voltage, and
a second circuit having first input nodes coupled to receive the output voltages from the first integrated circuit, the second integrated circuit comprising a first set of interconnected electronic devices coupled to the first input nodes, each device having a respective pair of device nodes, the set of electronic devices operable such that each voltage across each respective pair of the device nodes is no greater than the predetermined safe voltage.

35. The electronic system of claim 34 wherein the integrated circuit comprises a nonvolatile memory.

36. A method, comprising:
receiving a plurality of input voltages including a lowest voltage, a highest voltage, and at least one intermediate voltage in between the lowest and highest voltages, each difference between respective pairs of sequential ones of the input voltages being no greater than a predetermined safe voltage; and
operating a set of interconnected electronic devices each having a respective pair of device nodes such that each voltage across each respective pair of the device nodes is no greater than the predetermined safe voltage.

37. The method of claim 36 wherein operating the set of interconnected electronic devices comprises generating the input voltages with the set of electronic devices.

38. The method of claim 36 wherein operating the set of interconnected electronic devices comprises generating the input voltages and at least one other voltage, each difference between respective pairs of sequential ones of the input and other voltages being no greater than the predetermined safe voltage.

* * * * *